G. BAUMANN.
WHEEL.
APPLICATION FILED OCT. 20, 1919.

1,389,807.

Patented Sept. 6, 1921.

INVENTOR
Gustav Baumann
BY
Wm. H. Canfield.
ATTORNEY.

UNITED STATES PATENT OFFICE.

GUSTAV BAUMANN, OF RAHWAY, NEW JERSEY, ASSIGNOR OF ONE-HALF TO ANTON LEDERLE, OF RAHWAY, NEW JERSEY.

WHEEL.

1,389,807. Specification of Letters Patent. Patented Sept. 6, 1921.

Application filed October 20, 1919. Serial No. 331,913.

*To all whom it may concern:*

Be it known that I, GUSTAV BAUMANN, a citizen of Germany, and a resident of Rahway, county of Union, and State of New Jersey, have invented certain new and useful Improvements in Wheels, of which the following is a specification.

This invention relates to an improved wheel which is designed to take up the shocks incidental to road travel without dependence on springs and using the pressure of air as a resilient element, but not necessarily including the use of a pneumatic tire.

The invention is particularly designed to provide elements on the hub and on the rim which are telescopic and are normally held against extension by air pressure, the preferred form being by arranging a piston in a cylinder and providing a partial vacuum in the cylinder beyond the piston, but having the other face of the piston open to atmospheric pressure so that the piston and the cylinder inclosing the vacuum resist extension. For convenience of use and clearness of description in the specification, the vacuum mentioned is understood to refer to a partial vacuum, since the degree of reduction of pressure from the atmospheric pressure is considered a partial vacuum, and as these degrees of difference will vary, this whole description of vacuum is applied.

The invention further resides in constructing a wheel embodying these principles in which the details of construction are calculated to bring about the desired result, which details are more fully described hereinafter and finally embraced in the claims.

The invention is illustrated in the accompanying drawing, in which Figure 1 is a side view of half of a wheel, showing the improved construction, part of the wheel embracing one of the cylinders being broken away to more clearly illustrate the construction. Fig. 2 is a detail section showing the top portion of a cylinder and a link connecting the rim of the wheel with the piston rod of the cylinder, taken at right angles to the position shown in Fig. 1, and Fig. 3 is an enlarged section taken on a plane indicated by the line 3—3 in Fig. 1.

The wheel embodies any form of hub portion 10 and a rim 11, the rim, as shown, being supplied with a tread portion or tire 12, usually of hard rubber, although any form of tire can be used. The hub and the rim have the co-acting elements that provide the resiliency to the wheel, in the form shown the hub being provided with a series of cylinders 13, which can be separate, or, if desired, as shown in the drawing, made from one piece, such as a casting, and then bored out to receive a piston 14 which has a piston rod 15 projecting from the open end of the cylinder.

The end of the piston rod is provided with a link 16, which is pivoted to the end of the piston rod and also pivoted to the rim, as shown at 17, the pivots having their axes parallel, and the axes of the pivots being parallel to the axis of the wheel, so that the links 16 can move in only one plane, this plane being perpendicular to the axis of the wheel and permitting slight circumferential movement, so that the wheel is not braced when such elements are horizontal, thus permitting vertical movement of the hub relative to the rim.

A suitable apron or dust cap 18 is preferably arranged on the open end of each cylinder to prevent mud, dust and water entering, which would prevent the proper operation of the parts.

I desire to brace each piston rod by providing it with a cross-head 19 sliding in grooves 20, so that the piston rod is braced against movement when the link 16 swings, the piston rod thus being kept alined and preventing any tilting strain on the piston 14. Near the bottom of each piston I arrange a small valve or cock 21, by means of which the air between the piston 14 and the closed end of the cylinder can be withdrawn to the desired extent so as to form a partial vacuum, so that the tendency of the atmosphere is to push each piston into its cylinder.

It will thus be evident that when a shock comes to the rim or the hub of the wheel, it is opposed by the pressure of the air against the pistons of those cylinders that are subjected to a strain tending to pull the piston outward in its cylinder. This telescopic motion is thus resisted, and the amount of vacuum controlling the amount of resistance, there can be proper regulation of the resiliency of the wheel under shock.

It will be understood that modifications in form and in assembly can be made without departing from the scope of the invention.

I claim:

1. A wheel having a rim and hub, one member having a series of cylinders independent of each other and adapted to have the air partially withdrawn therefrom, pistons in the cylinders, and links connecting the pistons and the other member, said links being under tension when air is withdrawn.

2. A wheel having a hub with a series of separate radially arranged cylinders with pistons therein, piston rods on the pistons, a rim, and a link connecting each piston rod with the rim and adapted to be normally straight and under tension, so that when air is withdrawn from the cylinders the links suspend the hub from that part of the rim that is uppermost.

3. A wheel having a hub with radially arranged cylinders, a rim surrounding said cylinders, pistons in said cylinders, links connecting the rim and the pistons and being of a length to hold said pistons spaced from the inner ends of the cylinders when air is withdrawn from said cylinders, and valved connections for withdrawing air from said cylinders.

4. A wheel comprising a hub with radially arranged cylinders, pistons in the cylinders, piston rods on the pistons, bracing means for preventing movement of the outer ends of the piston rods circumferentially of the wheel, links connecting said braced ends of the rods and the rim and proportioned so that when air is withdrawn from the cylinders the pistons are spaced from the inner ends of the cylinders, and connections for permitting the withdrawal of air from the cylinders.

In testimony that I claim the foregoing, I have hereto set my hand, this 16th day of October, 1919.

GUSTAV BAUMANN.